July 17, 1956　　　Z. J. LANSKY　　　2,754,685
BALANCING APPARATUS
Filed May 26, 1951　　　　　　　　　　3 Sheets-Sheet 1
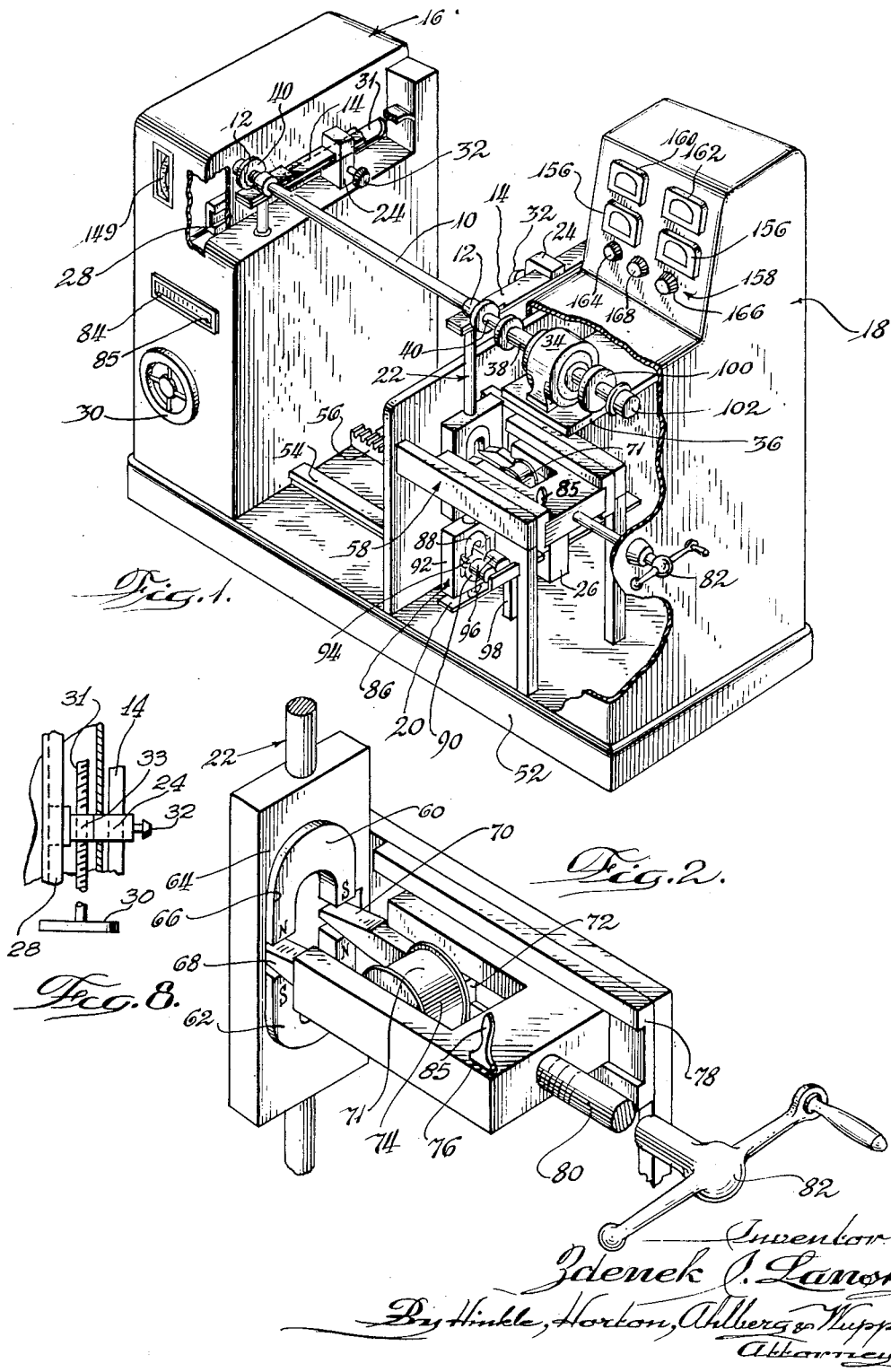

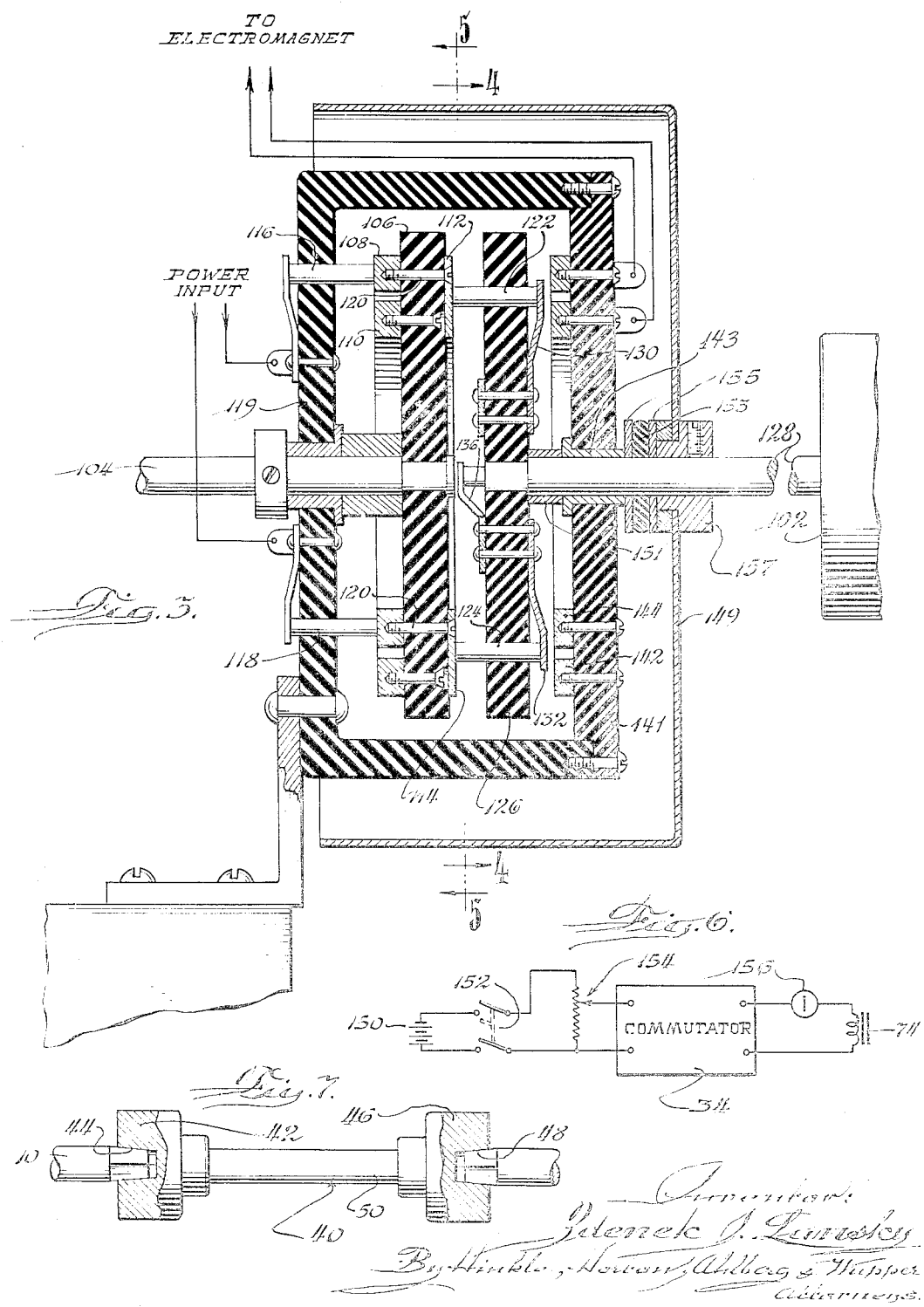

July 17, 1956      Z. J. LANSKY      2,754,685

BALANCING APPARATUS

Filed May 26, 1951      3 Sheets-Sheet 3

United States Patent Office 2,754,685
Patented July 17, 1956

2,754,685
BALANCING APPARATUS

Zdenek J. Lansky, North Riverside, Ill., assignor to Stewart-Warner Corporation, Chicago, Ill., a corporation of Virginia Application May 26, 1951, Serial No. 228,382

6 Claims. (Cl. 73—468)

This invention relates to devices for determining the amount and location of unbalanced mass in a rotatable body by rotating the body and counteracting vibrational forces due to unbalanced mass in the body by opposing forces applied by the unbalance determining device. For convenience, such devices will often be referred to herein as rotary balancing machines, or rotary balancing apparatuses.

Many machines of this character have been developed using a variety of fluid and electrical systems for offsetting the vibrational forces of the rotating body being checked for unbalance. Unbalance determining machines using electromagnetic force applying means for this purpose have many advantages from the standpoints of design and ease of control.

However, the desirability of providing for vibrations of considerable amplitude of the rotating body during some phases of each unbalance determining operation has previously restricted to an undesirable degree the strength of the vibrational forces which could as a practical matter be effectively offset by electromagnetic means in conventional unbalance determining machines. The degree to which this weakness of electromagnetic force applying means could be compensated for in conventional machines by increasing the size of the electromagnetic structure has been restricted by first cost and space limitations.

An object of the invention is to provide an improved balancing machine of the above character, capable of offsetting strong vibrational forces of a body being checked for unbalance by equally strong cyclic forces developed by magnetic force applying means of strikingly increased efficiency, thus affording both the advantages of large capacity and all electric operation in a machine well suited for economical construction.

A more specific object is to provide an unbalance determining machine, as recited in the previous object, in which the effective strength of improved magnetic means for offsetting vibrational forces can be multiplied as the vibrations of a body being checked for unbalance are suppressed, thus minimizing the size of the magnetic force applying structure required in a machine of a given capacity.

A further object is to provide a rotary balancing machine which gives accurate indications over a comparatively wide range of speeds of rotation.

Further objects, advantages, and features of the invention will become apparent from the following description of an illustrative embodiment taken with the drawings, in which:

Fig. 1 is a perspective view of a rotary balancing machine constructed in accordance with the invention;

Fig. 2 is a fragmentary perspective view of a portion of the machine including an electromagnet assembly;

Fig. 3 is a longitudinal sectional view of a commutator assembly forming a part of the machine;

Fig. 6 is a circuit diagram showing the arrangement for exciting the electromagnet;

Fig. 7 is an enlarged fragmentary partly sectional view illustrating a flexible coupling arrangement forming a part of the balancing machine; and Fig. 8 is a fragmentary sectional view showing the means for adjusting the positions of the clamps.

Figure 4:
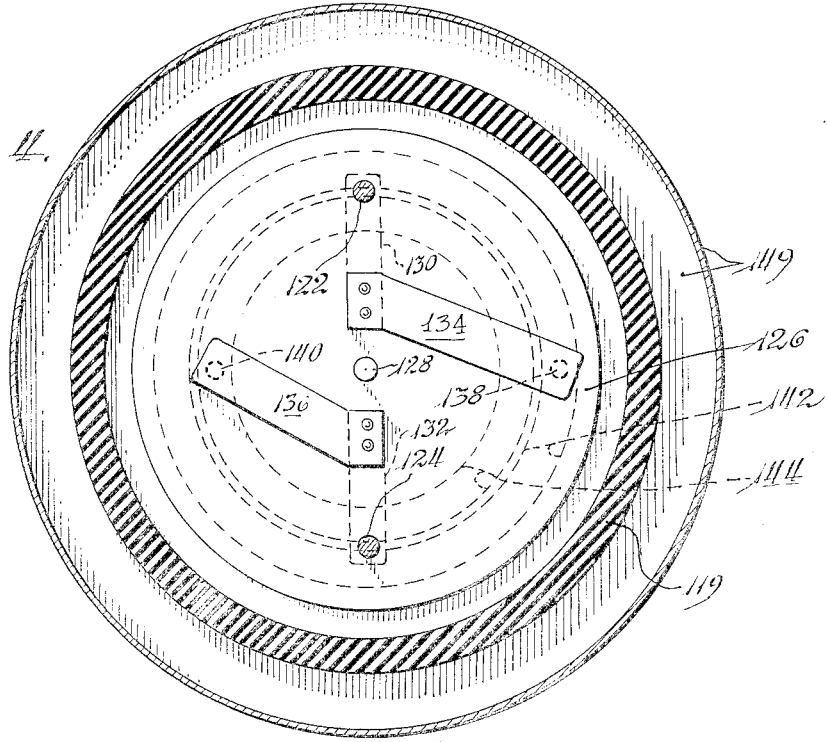
Fig. 4 is a transverse sectional view of the commutator assembly taken as indicated by the line 4—4 in Fig. 3.

In Fig. 1, means such as a shaft 10 is provided to support a rotatable body (not shown) which is to be tested for unbalance. The ends of the shaft are rotatably carried in a pair of bearings 12 which are mounted at the front or outer ends of a pair of leaf springs 14, the springs being rigidly supported at their rear ends on a pair of upright supporting frames 16 and 18. The springs form parts of respective resilient supporting structures for the shaft arranged in the shape of a parallelogram. One of the shaft supporting arrangements is housed in each of the uprights 16 and 18, but only the one housed in the right-hand upright 18 is completely illustrated, the other being substantially identical.

Each of the shaft supporting arrangements includes a lower leaf spring 20 which is substantially parallel with the upper leaf spring 14. The rear end of each lower spring is rigidly supported by one of the uprights 16 and 18, and the front end is connected with the front end of the upper leaf spring by means of a rigid vertical assembly 22 which is aligned with the shaft 10.

The free lengths of the upper and lower leaf springs 14 and 20 may be adjusted by shifting the positions of upper and lower clamps 24 and 26 which are slidable from front to rear in dovetail grooves in slideway members 28 carried by the uprights 16 and 18. A hand wheel 30 is mounted on the front of each of the uprights for simultaneously shifting the upper and lower spring clamps carried by that upright. As shown in Fig. 8, the hand wheel 30 is secured to a screw 31 threaded in a post 33 which is secured to the clamps 24. The upper spring clamps may be locked in position by tightening a pair of set screws 32, extending through slots 31 in the uprights 16, 18 to engage the respective slideway members 28.

The shaft 10 is rotated by two motors 34, one of them being housed in each of the uprights 16 and 18. The motors are mounted on base plates 36 rigidly mounted within the uprights. The motors have rotatable shafts 38 which are connected by means of flexible couplers 40 to the ends of the shaft 10 carrying the rotating body. Each of the flexible couplers may include a hub 42 (Fig. 7) at one end having a socket 44 for receiving the end of the shaft 10, and a similar hub 46 at the other end having a socket 48 for receiving the end of the motor shaft 38. The two members are connected by a length 50 of flexible shafting which may be made of a rubberlike material.

The shaft 10 may be removed from the machine by deforming the couplers 40 endwise to disconnect the ends of the shaft from the couplers. The shaft may then be slipped out of the bearings 12 carried by the upper springs 14.

The upright frames 16 and 18 are mounted on a base 52 by means of rails 54 and a rack 56 which provide an adjustment of the spacing between the uprights to accommodate shafts 10 of various lengths.

The balancing machine includes motive means in the form of two electromagnet assemblies 58 for applying forces to counterbalance or restrain internal unbalanced forces produced in a body rotating on the shaft 10. One of the electromagnet assemblies is located in each of the uprights 16 and 18. Each of the electromagnet assemblies, as best illustrated in Fig. 2, includes two U-shaped permanent magnets 60 and 62 which are carried by a non-magnetic mounting block 64 forming a part of the vertical assembly 22 connecting the upper and the lower leaf springs 14 and 20. The magnets are positioned in an oval shaped vertical slot 66 in the mounting block with the poles of the magnets confronting each other. The magnets are polarized so that unlike poles are opposite each other. Consequently a strong magnetic flux threads the gaps between the confronting poles.

Two horizontally disposed wedge shaped pole tips 68 and 70 are positioned centrally in the gaps between the permanent magnets 60 and 62. The pole tips form a part of a U-shaped core 72 of an electromagnet 71 energized by a coil 74 positioned around the core between the pole tips. The electromagnet 71 is mounted on a non-magnetic slide 76 which is movable in a horizontal direction in a pair of grooved slideway members 78 rigidly mounted in each of the uprights 16 and 18. The position of the slide may be adjusted by means of a screw 80 provided with a crank 82. A scale or dial 84 is provided on each of the uprights and a pointer 85 is provided on each slide 78 to indicate the position of the slide.

The balancing machine also includes a pair of vibration pickups 86 for indicating the extent of vibratory motions of the respective ends of the shaft 10. One of the pickups is mounted in each of the uprights 16 and 18. One advantageous form of pickup is illustrated including a pair of vertical U-shaped permanent magnets 88 and 90 mounted in a supporting block 92 forming a part of the vertical assembly 22 connecting the upper and lower leaf springs 14 and 20. The poles of unlike polarity on the permanent magnets confront each other. The poles of a U-shaped armature 94 are positioned in the gap between the poles of the permanent magnets, and coils 96 are mounted on the armature for producing electrical signals in response to vibratory motions of the permanent magnets with respect to the armature. The armature is rigidly mounted on one of the uprights 16 and 18 by means of a mounting post 98, for example.

Impulses for exciting the electromagnets 71 may be produced by two commutator assemblies 100 which are driven by the respective motors, only one of the commutators being illustrated in Fig. 1. The phase of the impulses produced by the commutators may be adjusted by means of a pair of control knobs 102 protruding from the sides of the respective uprights 16 and 18.

Figure 5:
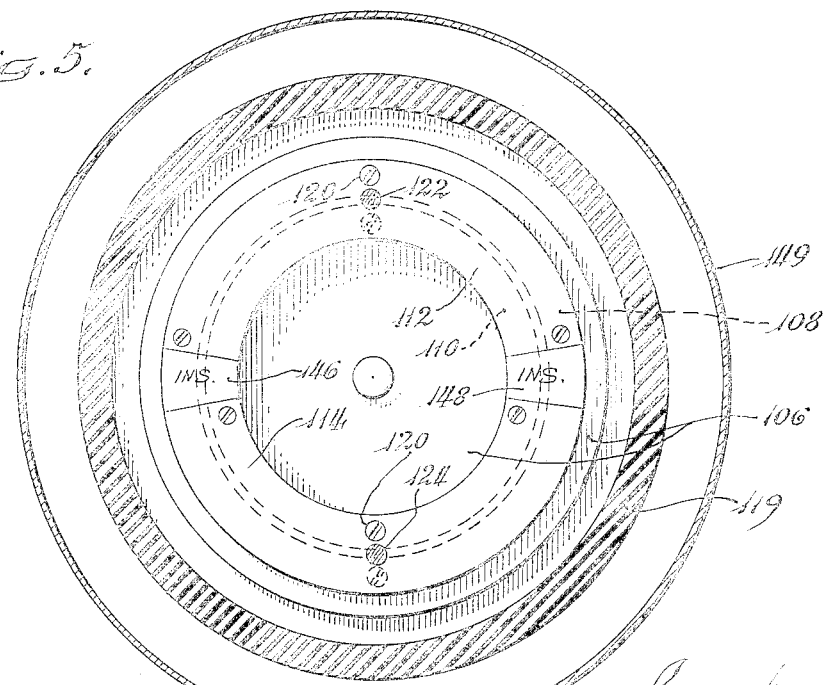
Fig. 5 is a transverse sectional view of the commutator assembly taken as indicated by the line 5—5 in Fig. 3.

Illustrative details of the commutator assemblies 100 are shown in Figs. 3–5. Each of the commutators may include a shaft 104 which is rotated in a fixed phase relationship with the shaft 10 by one of the motors 34. The shaft carries an insulating disc 106 which rotates two slip rings 108 and 110 for making connections to a pair of commutator segments 112 and 114 carried by the disc. Two stationary brushes 116 and 118 engage the respective slip rings. The brushes are carried by an insulating housing 119. The commutator segments may be connected with the respective slip rings by means of a plurality of mounting bolts 120.

Connections are made to the commutator segments 112 and 114 by means of two diametrically opposite brushes 122 and 124 carried by an insulating disc 126 which is mounted on an adjusting shaft 128 which is connected with one of the phase adjusting knobs 102. The connections with the commutator brushes are made by leaf springs 130 and 132 which are connected by a second set of leaf springs 134 and 136 (Fig. 4), and a second pair of brushes 138 and 140 to a pair of stationary slip rings 142 and 144.

The slip rings are mounted on an insulating cover 141 secured to the housing 119. The shaft 128 is supported by a bearing 143 carried by the cover 141.

As shown in Fig. 5, the commutator segments 112 and 114 are separated by a pair of narrow insulating segments 146 and 148 so that the commutator brushes 122 and 124 pass from one segment 112 or 114 to the other without short circuiting the segments.

A drum dial 149 is mounted on the shaft 128 to indicate the position of the commutator brushes 122 and 124.

Means is provided to hold the brush carrying disc 126 in a stationary adjusted position when the commutator carrying disc 106 is rotating. For example, a collar 151 may be positioned between the disc 126 and the bearing 143. A soft resilient washer 153 and a pair of backing washers 155 may be positioned between the bearing 143 and a hub 157 which supports the drum dial 149. The washer 153 may be compressed to provide friction between the bearing 143 and the collar 151 and also between the bearing and one of the backing washers 155.

As shown in Fig. 6, each of the commutators 100 is connected between the coil 74 of one of the electromagnets 71 and a source 150 of electric current which is indicated as a battery. A switch 152 may be provided to disconnect the commutator from the source, together with a potentiometer 154 to regulate the voltage applied to the commutator and an ammeter 156 to measure the current through the electromagnet. As indicated in Fig. 3, the power may be supplied to the commutator assembly 100 through the stationary brushes 116 and 118, and the electromagnet may be connected to the stationary slip rings 142 and 144. Of course, these connections may be reversed.

The right-hand upright 18 is provided with a control panel 158 which has a pair of meters 160 and 162 for indicating the outputs of the vibration pickups 86 housed in the left- and right-hand uprights 16 and 18, respectively. The meters 156 for indicating the currents through the electromagnets 71 are also mounted on the control panel. The control panel is provided with a pair of knobs 164 and 166 for adjusting the respective potentiometers 154, and a third knob 168, which may be utilized for varying the speed of the motors 34.

In the operation of the embodiment, a body to be balanced is mounted on the shaft 10. The shaft 10 may be removed from the balancing machine for this purpose by deforming the flexible couplers 40 endwise to disengage the ends of the shaft from the sockets 44 in the couplers. The shaft may then be slipped through the bearings 12.

The shaft 10 is then rotated by means of the motors 34. Two motors are provided to drive the opposite ends of the shaft in order to minimize torsional strains in the shaft. This arrangement is conducive to accuracy in determining the location and extent of unbalanced conditions in the body carried by the shaft 10.

If unbalanced conditions exist in the body under test, vibrations are set up in the system including the shaft 10 and its spring suspension. The vibratory movements of the rigid vertical assembly 22 connecting the horizontal leaf springs 14 and 20 are substantially vertical because the springs and the assembly are arranged to form a parallelogram.

The speed of the motors 34 and the positions of the spring clamps 24 and 26 preferably are adjusted to produce resonance of the vibrating system. Changing the positions of the clamps 24 and 26 changes the stiffness of the spring suspensions supporting the shaft 10, and thereby shifts the resonant frequencies of the systems. The adjustment to resonance may be made by obtaining maximum readings on the meters 160 and 162, which measure the outputs of the left- and right-hand vibration pickups 86. It is generally desirable to adjust the balancing machine to obtain vibrational resonance in order to secure the greatest sensitivity of the machine. At resonance the vibrations due to unbalanced conditions in a body have their greatest amplitude. However, one of the advantages of machines constructed in accordance with this invention is their ability to make accurate determinations of unbalanced conditions at speeds other than the resonant speed. The ensuing description will discuss this advantage in greater detail.

The motors 34 are rigidly mounted on the uprights 16 and 18. The flexible couplers 40 provide a driving arrangement which permits the ends of the shaft 10 to vibrate freely.

When the balancing machine is in operation, the electromagnets 71 are excited by means of the commutators 100 in order to restrain the vibrations of the shaft 10 due to unbalanced conditions in the body supported by the shaft. The electromagnet assemblies 58 are constructed to produce up and down forces on the vertical assemblies 22, to counterbalance the unbalanced internal forces in the body under test. Current in one direction through each of the coils 71 magnetizes the pole tips 68 and 70 of the core 72 so as to attract the upper permanent magnet 60 and repel the lower permanent magnet 62, thereby producing downward forces on the vertical assembly 22. Current flowing in the other direction through the coil 74 produces vertical upward forces on the assembly 22.

The magnitude of the up and down forces produced by the electromagnets 71 may be adjusted by varying the respective currents through the electromagnets by means of the potentiometers 154 (Fig. 6). The forces produced by the electromagnets may also be varied by shifting the slides 76 to move the wedge shaped pole tips 68 and 70 into and out of the gaps between the permanent magnets 60 and 62. Moving the wedge shaped pole tips into the gaps reduces the length of the air gap between the pole tips and the perament magnets and thereby increases the attractive and repulsive forces exerted by the electromagnet upon the permanent magnets. This adjustment of the air gaps provides smooth and continuous variation of the forces exerted by the electromagnets over a wide range.

The commutator assemblies 100 provide impulses of current to the electromagnets 71 to produce impulses of force upon the vertical assemblies 22 for counterbalancing internal unbalanced forces in the rotating body under test. The forces produced by the electromagnets 71 are synchronized with the unbalanced forces in the body under test by shifting the position of the brushes 122 and 124 which engage the commutator segments 112 and 114 in each commutator 100. Since the body under test is rigidly mounted on the shaft 10, the angular direction of the internal unbalanced forces produced in the body during rotation is generally in a fixed relation to the angular orientation of the shaft 10. The commutators 100 provide one particularly advantageous means for producing impulses the phase of which may be varied with respect to the angular phase of the shaft 10. Each of the commutators and its associated apparatus constitutes a synchronizer for producing impulses having the same frequency as the angular frequency of rotation of the shaft 10, but having a phase which is adjustable with respect to the angular rotational phasing of the shaft 10.

To determine the location of the unbalanced condition in the body carried by the shaft 10, the brushes 122 and 124 on each of the commutators 100 are shifted by manipulating the knobs 102 to obtain minimum readings on the meters 160 and 162, which measure the outputs of the left- and right-hand vibration pickups 86. Then the positions of the slides 76 on each of the electromagnet assemblies 58 are adjusted by manipulating the cranks 82 to obtain minimum readings on the meters 160 and 162. The minimum readings obtained by adjusting the electromagnets are substantially zero, since the unbalanced forces in the rotating body are substantially nullified. The positions of the brushes 122 and 124, as indicated by the drum dials 149, are indicative of the angular location of the unbalanced conditions in the body under test. The current readings of the meters 156 which measure the currents through the electromagnet coils 74, together with the positions of the slides 76 as indicated by the dials 84, give indications of the strength of the forces produced by the electromagnet assemblies 58 on the shaft 10 in order to nullify the vibrations of the shaft. The relative strength of the forces produced by the respective electromagnets 56 is indicative of the location of unbalanced conditions in the rotating body under test, particularly in the case of dynamic unbalance in the body. The strengths of the counterbalancing forces produced by the electromagnets are also indicative of the magnitude of the unbalanced conditions in the body.

Electromagnets constructed as shown, for example, readily develop sufficiently great forces to counterbalance the usual unbalanced forces in a body. Obtaining a vibrational null may require the exertion of large force impulses upon the shaft which supports the rotating body, but only a relatively small amount of power is required, since the movement of the body is small in the neighborhood of the null.

The arrangement for moving the tapered pole tips of the electromagnet into and out of the gap between the permanent magnets provides a particularly advantageous means for adjusting the forces exerted by the electromagnets.

Many of the details of the embodiments described above are merely illustrative and should not be taken as limitative. The invention may be practiced in many equivalent ways. The scope of the invention is indicated by the following claims.

I claim:

1. In a machine for determining the location and magnitude of unbalanced conditions in a rotatable body, rotary means for supporting the body, resilient means rotatably supporting said rotary means for vibration back and forth in a predetermined direction, an electromagnet having a pair of elements, means connecting one of the elements to the shaft for exerting forces in a predetermined direction for counterbalancing unbalanced internal forces in the body, the other element having a stationary mounting, one of the elements including means forming a pair of confronting oppositely polarized magnetized pole faces providing a gap therebetween, the other element including a tapered pole tip positioned in the gap and extending transversely to the predetermined direction, an electromagnetic coil to magnetize the wedge-shaped pole tip, and means to shift the tapered pole tip into and out of the gap to vary the strength of the forces produced by the electromagnet.

2. In an apparatus for determining the location and magnitude of unbalanced conditions in a rotating body, the combination of movable means for supporting the body for rotation, means for rotating the body, means for sensing vibration of said movable support means, an electromagnet assembly including a stationary element and a movable element, means connecting the movable element to said body support means for exerting forces thereon, magnetic means on one of the elements forming a pair of confronting magnetic pole faces providing a gap therebetween, the other element including magnetic means having a tapered pole tip positioned in the gap with opposed sides of the tip opposing the respective pole faces, an electromagnetic coil to energize the magnetic means for one of the elements, means for adjusting the position of the tapered pole tip in the gap generally along the direction of the taper of the tip to vary the spacing between opposite sides of the tip and the adjacent pole faces to regulate the strength of the forces produced by the electromagnet assembly, means to provide current impulses in the electromagnetic coil in synchronization with the rotation of the body, and means forming a part of the last named means to adjust the relative phasing of the current impulses and the rotation of the body.

3. An apparatus for determining the extent and location of unbalanced conditions in a rotatable body, comprising first and second means to support the body for rotation, said body support means being mounted for vibration in a predetermined direction, means for rotating the body, a pair of electromagnet assemblies connected to said first and second body supporting means respectively for producing back and forth forces in the predetermined direction on the respective supporting means to restrain vibrations of the body, each of the electromagnet assemblies including means defining a pair of spaced pole faces generally transverse to the predetermined direction, and providing a magnetic flux in the gap between the pole faces, and an electromagnet having a tapered pole tip extending between the pole faces generally in a direction transverse to the predetermined direction, a pair of vibration pickups to sense vibratory movements of the respective supporting means, a pair of synchronizing means interconnected with the body rotating means and the electromagnets for providing current impulses through the respective electromagnets in synchronism with the rotation of the body, means forming parts of the respective synchronizing means to adjust the relative phasing of the current impulses and the rotation of the body rotating means, and respective means to move the tapered pole tips into and out of the gaps between the pole faces for adjusting the strength of the forces produced by the respective electromagnet assemblies.

4. In a machine for determining the state of unbalance of a rotary body, the combination of means for mounting the body, movable support means for said body mounting means, means for rotating the body, a first magnetic member connected to said movable support means, means supporting said first magnetic member for movement in a fixed direction, a second magnetic member mounted on a stationary support and spaced from said first member in said fixed direction to form an air gap therebetween, an electromagnetic coil on one of said magnetic members for creating a magnetic field across said air gap to react with the other of said members, adjusting means connected to one of said magnetic members for moving the latter in a direction for reducing said air gap from a normal working clearance to a progressively decreased value in said fixed direction as vibration of said movable support means is suppressed to multiply the magnetic reaction between said two magnetic members for a given energization of said electromagnetic coil, and means for energizing said electromagnetic coil in synchronism with rotary movement of the body.

5. A machine for determining the state of unbalance of a rotary body, comprising, in combination, a pair of movable supports for the body, means for rotating the body, means for sensing movement of each of said supports, each of said supports having a first magnetic member connected thereto for movement in a fixed direction, a second magnetic member mounted on a stationary support and spaced from the first member in said fixed direction to form an air gap therebetween, an electromagnetic coil on one of said magnetic members for inducing a magnetic field across said air gap to react with the other magnetic member, adjusting means connected to one of said magnetic members for moving the latter in a direction to reduce said air gap in said fixed direction from a normal working clearance to a progressively decreased value as the vibration of said body support means is suppressed to multiply the reaction of said magnetic members on each other, and means for energizing said coil in synchronism with the rotation of the body to be checked.

6. In a machine for determining the state of unbalance of a rotary body, the combination of movable means for supporting the body, means for rotating the body, means for sensing movement of said body support means, a first magnetic member connected to said body support means for movement thereby, guide means coacting with said first magnetic member to confine movement thereof to a substantially linear path, said first magnetic member defining a pole face thereon disposed at a substantial angle to said linear path of movement of said first magnetic member, a second magnetic member defining thereon a pole face opposing said first mentioned pole face in spaced relationship thereto along said linear path to define with said first mentioned pole face an air gap, an electromagnetic coil mounted on one of said magnetic members, adjustable means supporting said second magnetic member for movement in a direction making an acute angle with said pole face thereon controllably to reduce said air gap from a normal working clearance to a progressively decreased value as the vibration of said body support means is suppressed to multiply the magnetic interaction between said magnetic members for a given energization of said electromagnetic coil, and means for energizing said electromagnetic coil in synchronization with the rotation of the body rotating means.

References Cited in the file of this patent

UNITED STATES PATENTS

| 421,195 | Ross et al. | Feb. 11, 1890 |
| 1,553,936 | Feeney | Sept. 15, 1925 |
| 1,553,941 | Kasley | Sept. 15, 1925 |
| 1,639,444 | Terry | Aug. 16, 1927 |
| 2,054,267 | Ohlson | Sept. 15, 1936 |
| 2,171,927 | Fuchs | Sept. 5, 1939 |
| 2,238,641 | Hanley | Apr. 15, 1941 |
| 2,289,200 | Lundgren | July 7, 1942 |
| 2,329,835 | Hope et al. | Sept. 21, 1943 |
| 2,521,141 | Allen | Sept. 5, 1950 |
| 2,554,538 | Murphy | May 29, 1951 |

FOREIGN PATENTS

| 282,681 | Germany | Mar. 15, 1915 |
| 583,728 | Germany | Sept. 8, 1933 |
| 624,857 | Germany | Jan. 30, 1936 |